United States Patent
Valenci et al.

(10) Patent No.: US 7,697,694 B2
(45) Date of Patent: Apr. 13, 2010

(54) SYNCHRONIZING THE EXCHANGE OF CRYPTOGRAPHY INFORMATION BETWEEN KERNEL DRIVERS

(75) Inventors: Moshe Valenci, Givat-Zeev (IL); Linden Minnick, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1020 days.

(21) Appl. No.: 11/413,394

(22) Filed: Apr. 28, 2006

(65) Prior Publication Data

US 2007/0061565 A1    Mar. 15, 2007

Related U.S. Application Data

(62) Division of application No. 09/895,061, filed on Jun. 29, 2001, now abandoned.

(51) Int. Cl.
*H04L 9/00* (2006.01)
*H04K 1/00* (2006.01)

(52) U.S. Cl. .................. 380/278; 380/277; 380/255

(58) Field of Classification Search .............. 380/278, 380/277, 255
See application file for complete search history.

(56) References Cited

U.S. PATENT DOCUMENTS 6,785,811 B1   8/2004   Bihlmeyer et al.

OTHER PUBLICATIONS

Solving User Problems with Intel Active Management Technology, printed out in 2009.*
Using Intel AMT in Small to Medium Business, printed out in 2009.*
An Introduction to Intel Active Management Technology, printed out in 2009.*
Intel Active Management Technology, Overview, printed out in 2009.*
Internet Official Protocol Standards, "Security Architecture for the Internet Protocol, Request for Comments (RFC) 2401", Nov. 1998, 66 pages, The Internet Society.

* cited by examiner

*Primary Examiner*—David Y Jung
(74) *Attorney, Agent, or Firm*—Blakely, Sokoloff, Taylor & Zafman LLP

(57) ABSTRACT

Methods and apparatuses for synchronizing the exchange of cryptography information between kernel drivers. A high level application in an electronic system passes a pointer to a base driver. The pointer is a unique identifier for cryptography information, such as a Security Association (SA), that the base driver uses to populate a cryptography information table for performing cryptography operations on secure traffic data packets. If the network interface device and/or its associated driver are reset, the pointer is used to repopulate the cryptography information table with specific cryptography information needed to perform cryptography operations on the data packets.

20 Claims, 7 Drawing Sheets

SYNCHRONIZING THE EXCHANGE OF CRYPTOGRAPHY INFORMATION BETWEEN KERNEL DRIVERS

CROSS REFERENCE TO RELATED APPLICATION

This application is a divisional of U.S. patent application Ser. No. 09/895,061, filed Jun. 29, 2001 now abandoned.

FIELD OF THE INVENTION

The invention relates to processing of cryptography information. More specifically, the invention relates to techniques for passing security association information between kernel drivers.

BACKGROUND OF THE INVENTION

Data transferred over a network can be encrypted to protect its confidentiality and integrity. Because many different encryption methods are used, data packets contain an index into a table of structures containing cryptography (crypto) information necessary to indicate to the receiving system how to decrypt the data. The crypto information can be contained in a data structure called a security association (SA). Network interface devices in the transmitting and receiving systems perform crypto operations (e.g., encryption, decryption, authentication) on the data packets based on the crypto information in the SA.

A device driver directs how the network interface devices will perform crypto operations. The device driver stores in system memory a table of crypto information necessary for the network interface devices to perform crypto operations on data packets. The information may also be stored in tables on the devices. These tables can include, for example, unique identifiers for the cryptography data structures, cryptography keys, source addresses, destination addresses, network protocol types, and other information related to crypto operations.

One technique for populating a table of crypto information is for a high level application such as an operating system (OS) to control the process. With this technique, the high level application is responsible for maintaining consistency of the security state between the upper system layers (e.g., OS, high level applications) and the lower system layers (e.g., base drivers, hardware devices) that perform crypto operations. The high level application manages a unique handle that the driver creates for each data structure of crypto information which is passed to the intermediate security layer and/or base driver. All operations on data packets by the intermediate security layer driver and/or network interface device drivers and/or network interface devices references crypto information with the handle. If, for some reason, the network interface device and/or its associated driver is reset, the data in the crypto information tables is lost and the handles must be discarded. The high level application is then responsible for passing the crypto information to the base driver again so that it can repopulate the crypto information tables.

Some operating systems, for example, Windows® 2000 and Windows® XP, both available from Microsoft Corporation, guarantee that the crypto information tables are populated. Thus, if a network interface device and/or its associated device driver is reset, the operating system will pass the crypto information to the base drivers in order to allow the repopulation of the tables contained by the network interface device and/or its associated driver. One shortfall of such a technique is an inefficient use of resources because the entire table is repopulated, even though some of the information may not be used in the future. Another shortfall occurs with dynamic installation or removal of a network interface device; crypto information can be lost, or a device may be unable to acquire the proper security state. Another shortfall is that attempts to store crypto information in a network interface device and its associated driver during reset often fails, which requires repeated tries to store the information and/or failure to store the information.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for passing cryptography information between kernel drivers are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

Briefly, techniques for passing cryptography (crypto) information, such as Security Associations (SAs), necessary to perform crypto operations (e.g., encryption, decryption, authentication) on secure traffic data packets between kernel drivers are described. For example, a Security Association (SA) is a data structure of crypto information used in the Internet Protocol (IP) Security (Ipsec) standard, IP Security Internet Engineering Task Force (IETF) Request for Comments (RFC) 2401, published November 1998, that is passed between layers of an electronic system implementing IPsec. A pointer to the crypto information is created and passed to a base driver. The base driver uses the pointer to populate a crypto information table to enable a network interface device to perform crypto operations on the data packets. In one embodiment, if the network interface device and/or its associated driver are reset, the pointer is used to repopulate the crypto information table as needed with the specific data structures of crypto information needed to perform crypto operations on the data packets.

Security status information is indicated from a base driver to an intermediate driver. The intermediate driver uses the security status information to determine whether processing should be performed on the packet. In one embodiment, the security status information indicates that crypto information necessary to process a data packet was missing. In one embodiment, the intermediate driver then passes the missing crypto information to the base driver.

Figure 1:
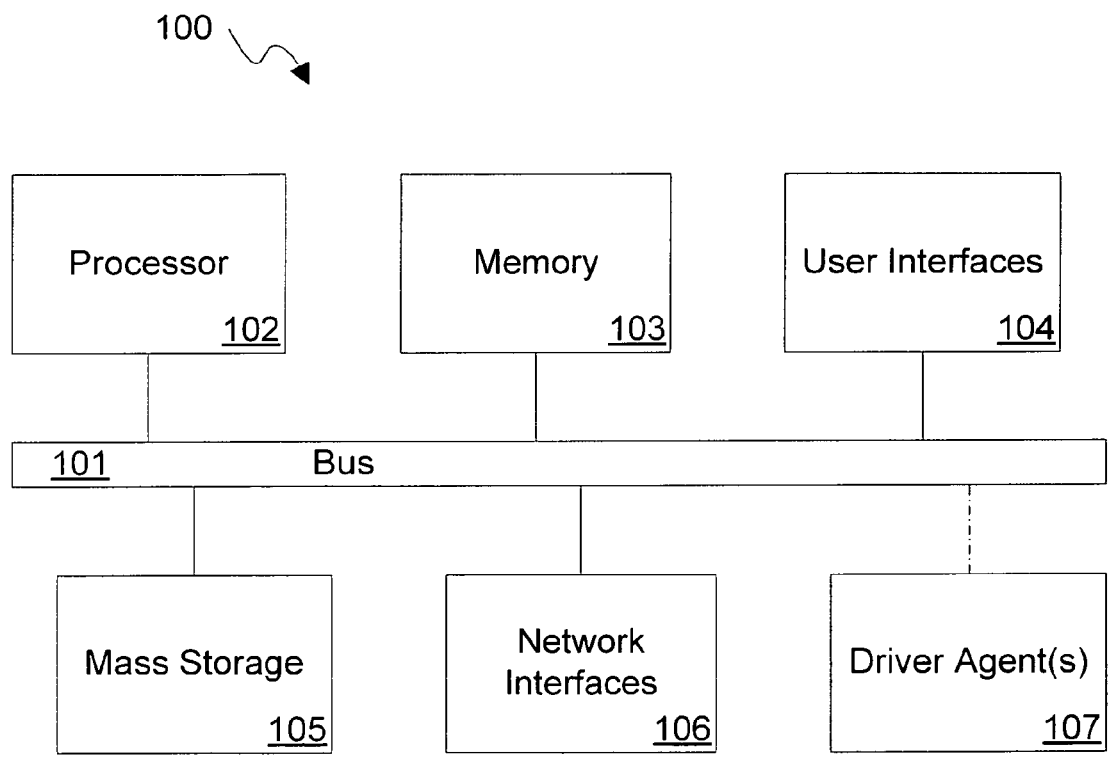
FIG. 1 is one embodiment of a block diagram of an electronic system.

FIG. 1 is one embodiment of an electronic system. Electronic system 100 may be, for example, a computer, a Personal Digital Assistant (PDA), a set top box, or any other electronic system. System 100 includes bus 101 or other communication device to communicate information, and processor 102 coupled with bus 101 to process information and to execute instructions. System 100 further includes memory 103, coupled to bus 101 to store information and instructions to be executed by processor 102. Memory 103 may also be used to store temporary variables or other intermediate information during execution of instructions by processor 102. Memory 103 may include random access memory (RAM), read-only memory (ROM), flash, or other static or dynamic storage media.

User interfaces 104 are coupled to bus 101 too allow interaction with a user. User interfaces 104 can be, for example, input devices (e.g., mouse, keyboard, touchpad, etc.) and/or output devices (e.g., cathode ray tube (CRT) monitor, liquid crystal display (LCD), etc.). Mass storage 105 can be coupled to system 100 to provide instructions to memory 103. Mass storage 105 can be, for example, a magnetic disk or optical disc and its corresponding drive, a memory card, or another device capable of storing machine-readable instructions. Network interfaces 106 can be coupled to bus 101 to enable system 100 to communicate with other electronic systems via a network.

Driver agent 107 may be coupled to system 100 to perform driver features in hardware. Driver agent 107 may be an Application Specific Integrated Circuit (ASIC), a special function controller or processor, a Field Programmable Gate Array (FPGA), or other hardware device to perform the functions of a driver. Driver agent 107 is not a necessary part of system 100. In one embodiment, system 100 may contain a driver agent that provides system control over network interfaces 106, for example, a Network Interface Card (NIC) driver controlling a NIC.

Network interfaces 106 couples electronic system 100 to other electronic systems over a network. In one embodiment, non-secure traffic streams are transmitted and/or received by system 100 through network interfaces 106. Similarly, secure traffic streams can be transmitted and/or received by system 100 through network interfaces 106. Transmitting secure traffic streams requires that crypto operations be performed on data packets to authenticate and/or encrypt data before being transmitted. Receiving secure traffic streams requires that crypto operations be performed on data packets to authenticate and/or decrypt data after being received. The crypto operations can be performed by network interfaces 106. For example, a driver agent can direct network interfaces 106 decrypt a received data packet. The driver agent can be driver agent 107 or a software driver agent incorporated from a series of machine-readable instructions stored within memory 103.

Instructions can be provided to memory 103 from a storage device, such as magnetic disk, CD-ROM, DVD, via a remote connection (e.g., over a network), etc. In alternative embodiments, hard-wired circuitry can be used in place of or in combination with software instructions to enable system 100 to transfer crypto information from an intermediate driver agent to a base driver agent as described below. Thus, the electronic system depicted above is not limited to any specific combination of hardware circuitry and software structure.

Instructions can be provided to memory 103 from a form of machine-accessible medium. A machine-accessible medium includes any mechanism that provides (i.e., stores and/or transmits) information in a form readable by a machine (e.g., a computer). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Figure 2:
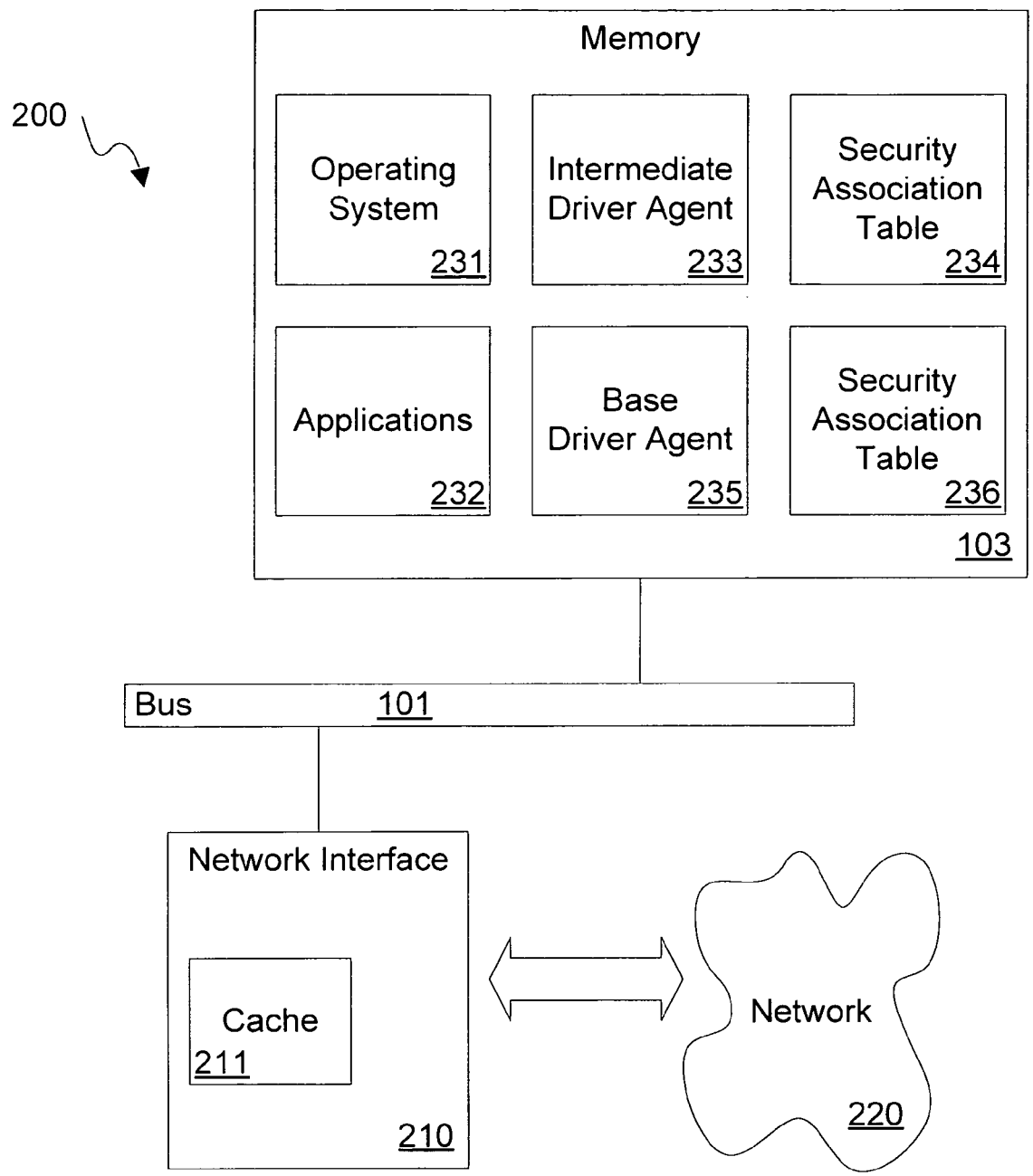
FIG. 2 is one embodiment of a block diagram of an electronic system coupled to a network through a network interface.

FIG. 2 is one embodiment of a block diagram of an electronic system coupled to a network through a network interface. In one embodiment, Network Interface (NI) 210 is a communication interface that enables system 200 to communicate to other electronic systems coupled to network 220. For example, NI 210 can be a NIC. In one embodiment, data packets are received from network 220 into NI 210. Similarly, data packets can be transmitted to network 220 from NI 210. In one embodiment, cache 211 contains a table of crypto information necessary to perform crypto operations on the packets. For example, NI 210 can use data stored in cache 211 to decrypt a packet after it receives the packet.

Memory 103 contains operating system (OS) 231 which directs operations of system 200. In one embodiment, OS 231 is the highest layer of control of system 200. Intermediate driver agent 233 and base driver agent 235 are lower layers of system control. In one embodiment, OS 231 delivers crypto information to intermediate driver agent 233. In another embodiment, applications 232 can contain agents of a higher layer of control than intermediate driver agent 233 and deliver crypto information to intermediate driver agent 233. Applications 232 can also contain other programs (e.g., word processor(s), electronic mail (e-mail) programs).

Although referred to herein as delivering and/or passing crypto information between an intermediate driver agent and a base driver agent, delivering and/or passing crypto information as described can be practiced by other system layers. For example, an OS may deliver crypto information to a base driver agent. In another example, a base driver agent may pass information to a high level application. In general, system layers applications and/or system elements that control the flow of operations in an electronic system, from a low level layer, such as network hardware, to a high level layer, such as an OS.

In one embodiment, memory 103 contains security association tables 233 and 236, which are data structures of SAs. Memory 103 may contain other tables of crypto information like SA table 234 and SA table 236, which are examples of tables of crypto information. Memory 103 can also contain intermediate driver agent 233 and/or base driver agent 235. In one embodiment, intermediate driver agent 233 creates pointers to crypto information in SA table 234. In one embodiment, intermediate driver agent 233 creates handles for the crypto information data structures that are unique identifiers for the SAs. The pointers can be used to access the data structures of crypto information, including the unique identifiers. Intermediate driver agent 233 passes the pointers to base driver agent 235. For example, a packet created for transmission by the upper system layers is passed by intermediate driver agent 233 to base driver agent 235 with a pointer to the memory location of the SA associated with the data packet. Base driver agent 235 can then use the pointer access the crypto information in SA table 234.

Base driver agent 235 maintains SA table 236 for directing the processing of secure traffic data streams. In one embodiment, base driver agent 235 uses the pointer to populate SA table 236. For example, base driver agent 235 uses the pointer to access SA table 234 to repopulate SA table 236 with SAs if the information in the table is lost. For example, the data in SA table 236 is lost if NI 210 is reset. In one embodiment, base driver agent 235 uses the pointer to populate cache 211 if the data in cache 211 is lost, such as if NI 210 or its associated base driver agent is reset.

In one embodiment, base driver agent 235 uses the pointer to obtain crypto information from SA table 234 if the data necessary to perform crypto operations on a data packet is missing from SA table 236. For example, an NI device may be dynamically added to system 200 whose base driver agent may be unable to acquire the proper security state. In another example, an NI device may be dynamically removed from system 200. In another example, a base driver agent may be dynamically removed from system 200. If the information necessary to process data packets from secure traffic streams is not found in SA table 236, the information can be obtained with the pointer.

In one embodiment, base driver agent 235 uses the pointer associated with a packet to access crypto information necessary to perform crypto operations on data packets from SA table 234 if adding a data structure of crypto information to SA table 236 fails. For example, in an IPsec implementation, adding SAs during reset often fails. Tracking when a network interface device or its associated driver is ready to receive the data structures of crypto information is difficult. In prior art, if the data in SA table 236 is lost, missing, or unable to be added, the NI device will be unable to process data packets.

Figure 3:
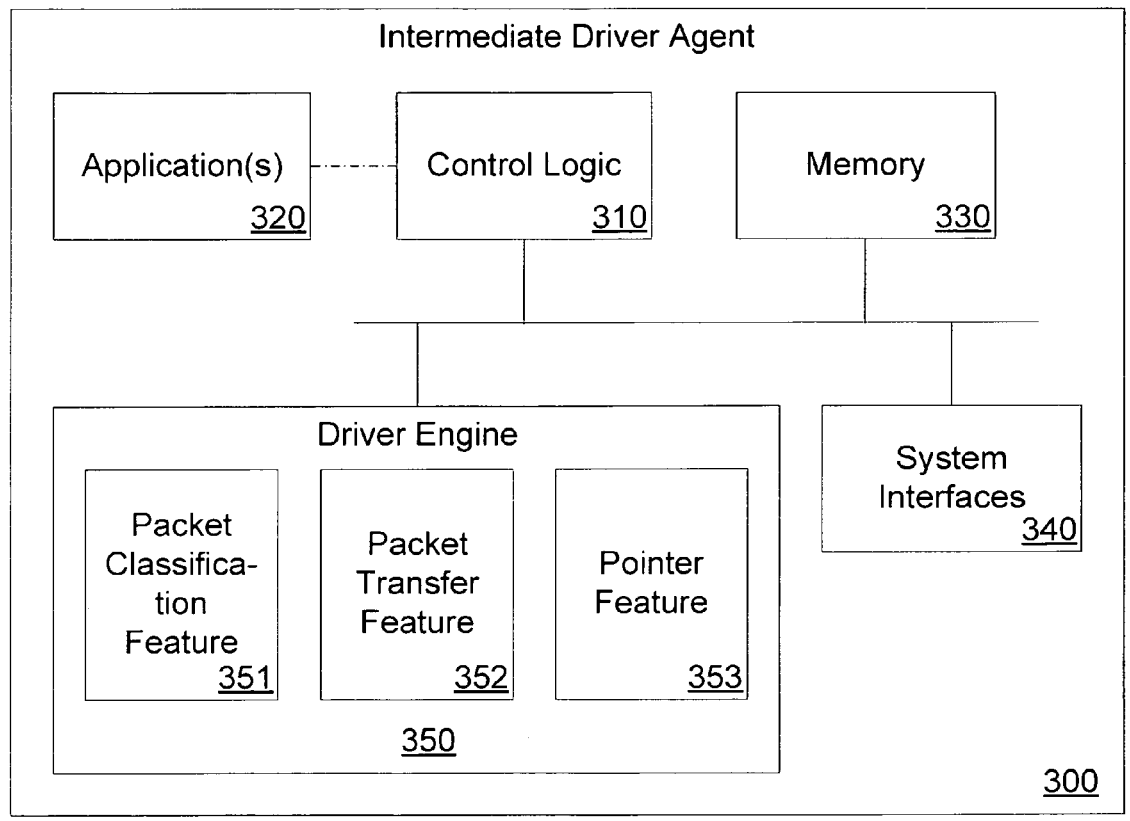
FIG. 3 is one embodiment of a block diagram of an intermediate driver agent.

FIG. 3 is one embodiment of a block diagram of an intermediate driver agent. Control logic 310 directs the flow of operation of driver agent 300. In one embodiment, control logic 310 is a series of software instructions to perform logic operations. In another embodiment, control logic 310 can be implemented by hardware control logic, or a combination of hardware-based control logic and software instructions.

System interfaces 340 provide a communications interface between intermediate driver agent 300 and an electronic system. For example, intermediate driver agent 300 can be part of a computer system and system interfaces 340 provide a communications interface between intermediate driver agent 300 and the computer system via a system bus. Thus, control logic 310 can receive a series of instructions from application software external to intermediate driver agent 300.

Intermediate driver agent 300 is not limited to being local to an electronic system. For example, system interfaces 340 may provide a communications interface between intermediate driver agent 300 and an electronic system through a network. In one embodiment, intermediate driver agent 300 may contain applications 320 to provide internal instructions to control logic 310. Applications 320 are not necessary to the function of intermediate driver agent 300.

Packet classification feature 351 enables intermediate driver agent 300 to match a data packet with its corresponding crypto information from a table of crypto information so that the data packet can be processed correctly. For example, packet classification feature 351 can enable intermediate driver agent 300 to direct a base driver agent which SA to use to encrypt a data packet prior to transmission of the data packet.

Packet transfer feature 352 enables intermediate driver agent 300 to transfer data packets to/from other system layers. For example, intermediate driver agent driver agent 300 can pass a data packet to be transmitted to a base driver agent. In another example, a high-level system layer such as an OS can create a data packet for transmission and pass the packet down to intermediate driver agent 300. Similarly, a base driver agent can pass a packet of ingress data up to intermediate driver agent 300.

Pointer feature 353 enables driver agent 300 to create a pointer to memory location of crypto information. For example, pointer feature 353 enables intermediate driver agent 300 to create a pointer to the memory location of crypto information, such as data in an SA table. The pointer can be passed to a base driver agent and used to access a unique identifier for the crypto information stored with the information in a crypto information table. The base driver agent can then use the pointer to access crypto information necessary to perform crypto operations on data packets.

Packet classification feature 351, packet transfer feature 352, and pointer feature 353 can exist independently of and/or be external to intermediate driver agent 300. Thus, driver engine 350 may exist as a more complex or less complex embodiment, containing some, all, or additional features to those represented in FIG. 3. In one embodiment, intermediate driver agent 300 is part of a layered security driver. For example, intermediate driver agent 300 can be an Advanced Networking Services (ANS) driver as part of a Bump In The Stack (BITS) or Bump In The Wire (BITW) layered security driver implementation. On transmit, a Transmission Control Protocol/Internet Protocol (TCP/IP) stack may pass a data packet to an ANS driver, which then classifies the packet with its crypto information, and then passes the packet down the line for encryption and transmission. On receive, an NI device driver passes a received data packet to an ANS driver, which can then process the packet and/or pass it up to a TCP/IP stack.

Figure 4:
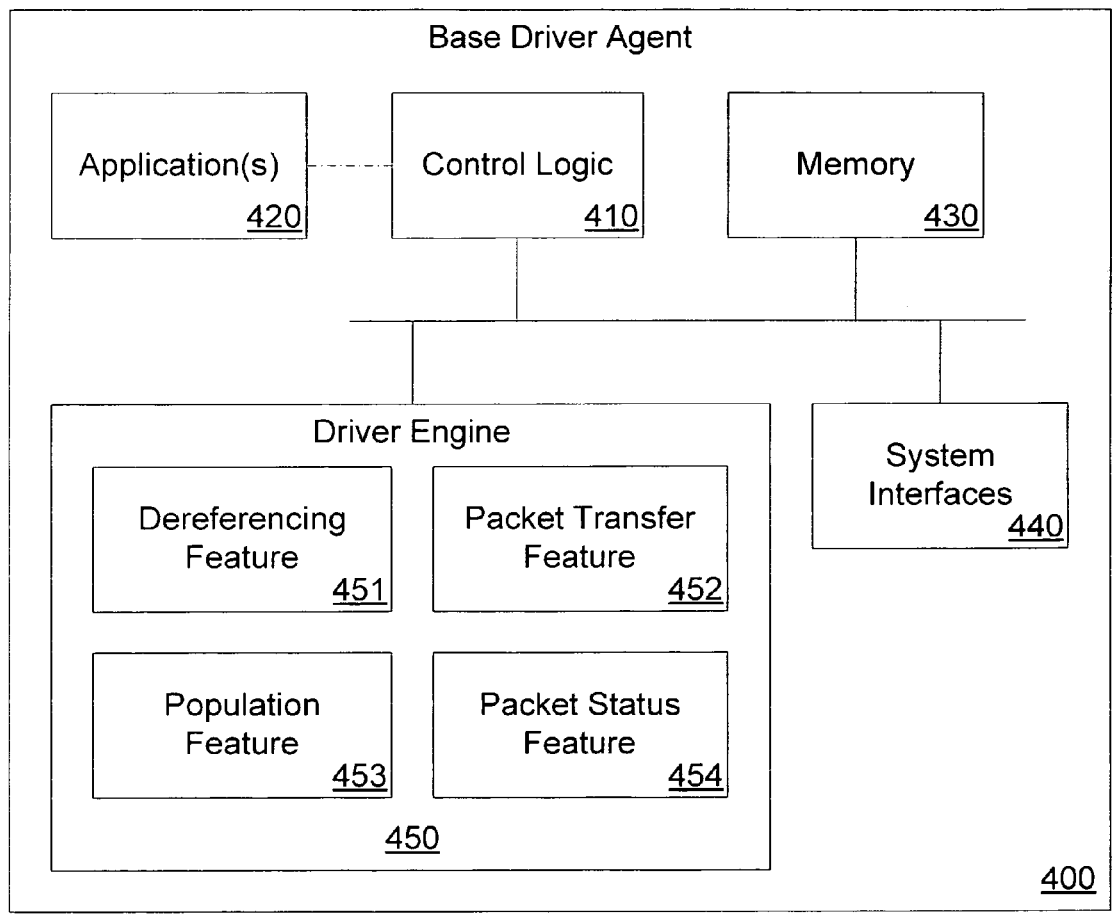
FIG. 4 is one embodiment of a block diagram of a base driver agent.

FIG. 4 is one embodiment of a block diagram of a base driver agent. Control logic 410 directs the flow of operation of base driver agent 400. In one embodiment, control logic 410 is a series of software instructions to perform logic operations. In another embodiment, control logic 410 can be implemented by hardware control logic, or a combination of hardware-based control logic and software instructions.

System interfaces 440 provide a communications interface between base driver agent 400 and an electronic system. For example, base driver agent 400 can be part of a computer system and system interfaces 440 provide a communications interface between base driver agent 400 and the computer system via a system bus. Thus, control logic 410 can receive a series of instructions from application software external to base driver agent 400. Base driver agent 400 is not limited to being local to an electronic system. For example, system interfaces 440 may provide a communications interface between base driver agent 400 and an electronic system through a network. In one embodiment, base driver agent 400 contains applications 420 to provide internal instructions to control logic 410. Applications 420 are not necessary to the function of base driver agent 400.

Dereferencing feature 451 enables base driver agent 400 to utilize a pointer to acquire information referenced by the pointer. For example, dereferencing feature 451 enables base driver agent 400 to dereference a pointer to information in a table of crypto information passed by a higher layer driver agent to acquire the SA information necessary to direct processing of a data packet. In another example, dereferencing feature 451 enables base driver agent 400 to access the SA information necessary to populate a table of crypto information maintained by base driver agent 400. In another example, dereferencing feature 451 enables base driver agent 400 to use a pointer passed by a higher layer to a memory location in a table of crypto information to acquire the information necessary to populate a cache on a network interface device. This enables population of the table and/or the cache to be performed independently of the OS in the electronic system. Dereferencing can be performed in any manner known in the art.

Packet transfer feature 452 enables base driver agent 400 to transfer data packets to/from other system layers. For example, an NI device associated with base driver agent 400 can receive a data packet which base driver agent 400 passes up to an intermediate driver agent. The NI device could be connected to the Internet and receive a data packet from a secure traffic stream that base driver agent 400 passes up to a higher layer of a security driver. In another example, a higher-level system layer, such as an intermediate driver agent, can pass a data packet down to base driver agent 400 to be transmitted over a network. Thus, base driver agent 400 could be a NIC driver and an ANS driver could pass it a data packet to be transmitted over a secure traffic network stream.

Populating feature 453 enables base driver agent 400 to populate a crypto information table with data. For example, if an NI device associated with base driver agent 400 was reset, causing the data in its crypto information table to be lost, populating feature 453 enables base driver agent 400 to restore the data in the table. The table could be a table of SAs maintained by base driver agent 400, or optionally a cache of SAs on a NIC. The information in the table or tables that base driver agent 400 populates enables the NIC to perform hardware offload processing on data packets.

Packet status feature 454 enables base driver agent 400 to indicate to system upper layers the status of the processing of a data packet. For example, a packet may be from a non-secure source, and packet status feature 454 could indicate that the packet was processed without needing offload processing. In another example, packet status feature 454 may indicate that a packet was processed successfully in hardware. In another example, packet status feature 454 may indicate that a packet was processed, but that the packet failed authentication. In another example, packet status feature 454 may indicate that the crypto information needed to process the packet was missing.

Dereferencing feature 451, packet transfer feature 452, populating feature 453, and packet status feature 454 can exist independently of and/or be external to driver agent 400. Thus, driver engine 450 may exist as a more complex or less complex embodiment, containing some, all, or additional features to those represented in FIG. 4. In one embodiment, base driver agent 400 is part of a layered security driver. For example, base driver agent 400 can be a NIC driver in a BITS/BITW layered security driver implementation. On transmit, an ANS driver may pass a data packet down to the NIC driver, which then passes the packet to the NIC for transmission. On receive, a NIC driver directs how the NIC receives data packets, including directing hardware offload processing.

Figure 5:
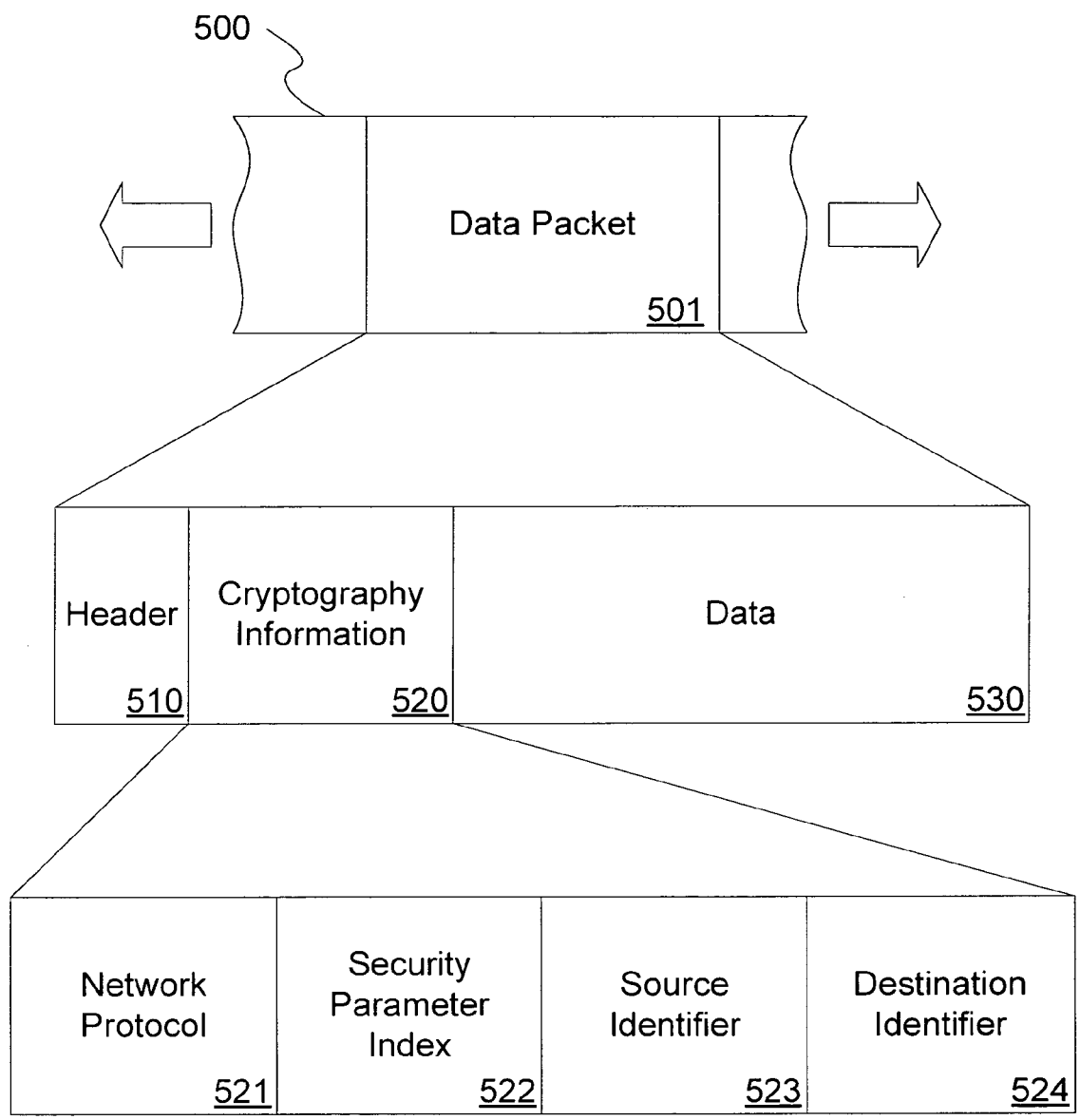
FIG. 5 is one embodiment of a block diagram of a data packet.

FIG. 5 is one embodiment of a block diagram of a data packet. In one embodiment, data packet 501 is embodied in traffic stream 500. For example, traffic stream 500 can be a secure traffic stream used by multiple networked electronic systems to communicate. For example, traffic stream 500 may be a network traffic stream between two electronic systems using the IPsec encryption standard to transfer secure information over the Internet.

In one embodiment, data packet 501 consists of header 510, cryptography information 520, and data 530. In one embodiment, cryptography information 520 consists of network protocol 521, security parameter index 522, source identifier 523, and destination identifier 524. Network protocol 521, security parameter index 522, source identifier 523, and destination identifier 524 can exist independently of and be external to cryptography information 520. Thus, cryptography information may be more or less complex, consisting of some, all, or additional elements to those depicted in FIG. 5.

In one embodiment, cryptography information 520 is necessary for an electronic system to process data packet 501. For example, an electronic system receiving data packet 501 using IPsec will locate cryptography information 520 to authenticate the packet and determine how to decrypt data 530. Similarly, an electronic system transmitting data packet 501 using IPsec will use cryptography information 520 to encrypt the data prior to transmission.

Figure 6:
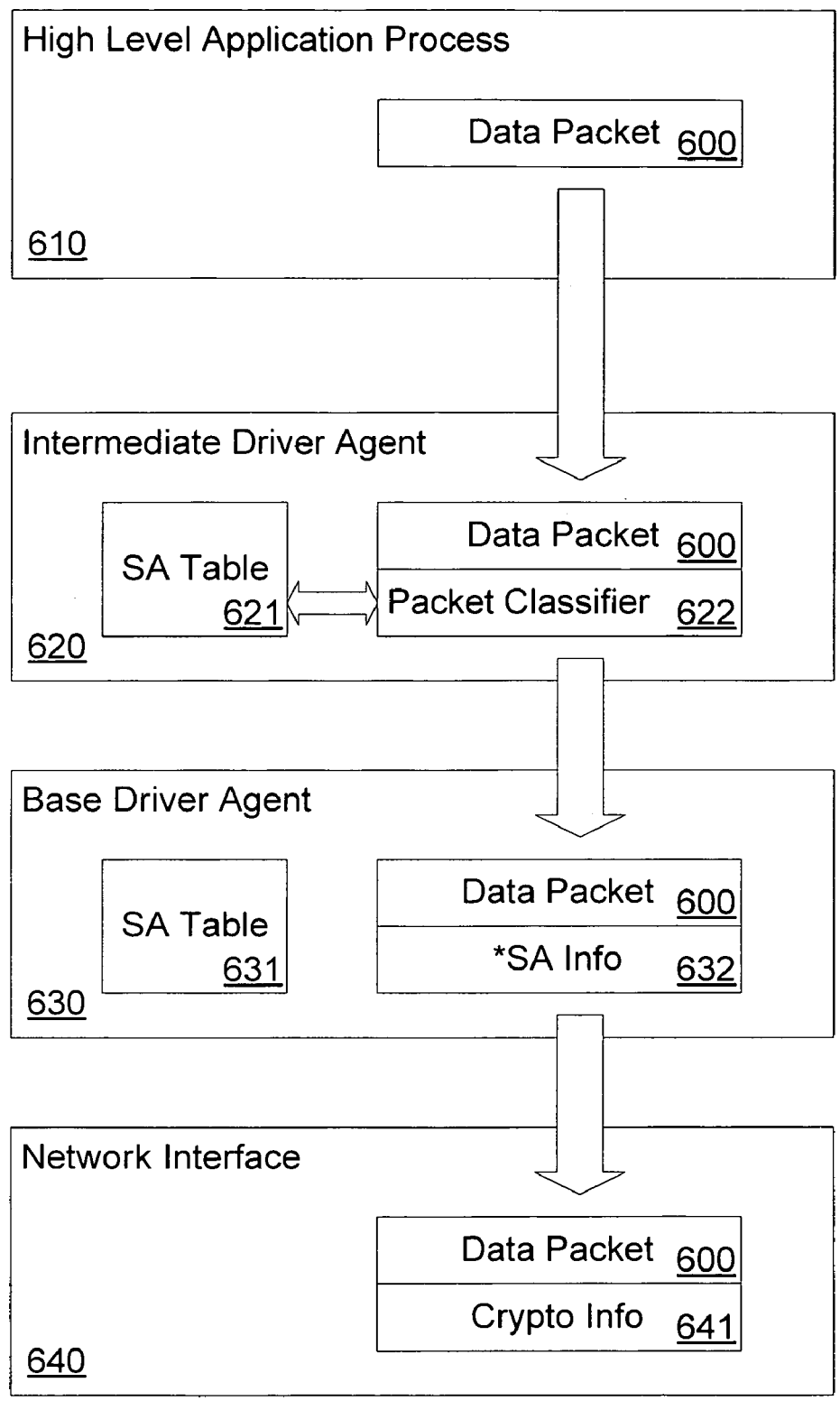
FIG. 6 is one embodiment of a flow diagram for transmission of a data packet from an electronic system implementing a layered security driver.

FIG. 6 is one embodiment of a flow diagram for transmission of a data packet from an electronic system implementing a layered security driver. Data packet 600 is generated by high level application process 610 and prepared for transmission. For example, high level application process can be a TCP/IP stack. Generation and preparation of data packet 600 can include, for example, creating bit patterns to represent a data communication, and bit patterns to represent security information necessary to perform crypto operations on data packet 600.

Data packet 600 is passed to intermediate driver agent 620. Intermediate driver agent 620 can be, for example, an ANS driver as part of a BITS/BITW layered security driver implementation. In one embodiment, intermediate driver agent 620 maintains SA table 621, which is a table of SAs that contains all the information necessary to perform crypto operations on data packet 600. Although FIG. 6 depicts data structures of crypto information as containing SAs, SA table 621 and SA table 631 are only example embodiments of data structures of crypto information, and are not limited to containing crypto information data structures that are SAs.

Intermediate driver agent 620 provides memory management for SA table 621, but SA table 621 does not necessarily reside in intermediate driver agent 620. In one embodiment, intermediate driver agent 620 includes packet classifier 622, which associates data packet 600 with an SA for hardware offload processing. The SA corresponds to data in SA table 621. For example, a system TCP/IP stack may create a data packet to transmit as part of an IPsec traffic exchange. When the packet is passed to a BITS/BITW security driver, an ANS driver will associate it with an SA from an SA table in memory maintained by the ANS driver.

Data packet 600 is passed to base driver agent 630. Base driver agent 630 can be, for example, a NIC driver. In one embodiment, intermediate driver agent 620 passes *SA info 632 with data packet 600, *SA info 632 being a pointer to information in SA table 621 corresponding to the SA associated with data packet 600. Pointer *SA info 632 is created by intermediate driver agent 620. Base driver agent 630 accesses SA table 621 through *SA info 632 created by intermediate driver agent 620. Creating and passing pointer *SA info 632 may be accomplished by any manner known in the art.

A pointer is a reference to actual data, typically the address of a location in memory. A pointer can be created by any function for most data structures or data residing in fixed memory locations. A handle is a reference to actual data that is managed by an electronic system OS. The handle can be treated as another system resource, the OS preventing conflicting memory access by multiple functions. Thus, a handle differs from a pointer in that the handle is controlled by the OS, whereas a pointer can be created and controlled by any function. Because *SA info 632 is a pointer rather than a handle, base driver agent 630 can access the information in SA table 621 simply by dereferencing *SA info 632.

Base driver agent also contains SA table 631, which is a table of SAs that contain all the information necessary to perform crypto operations on data packet 600. Base driver agent 630 provides memory management for SA table 631, but SA table 631 does not necessarily reside in base driver agent 630. In one embodiment, base driver agent 630 uses pointer to *SA info 632 to populate SA table 631. For example, if the NI device associated with base driver agent 630 was reset, causing the information in SA table 631 to be lost, base driver agent 630 could use pointer *SA info 632 to acquire the specific SA information necessary to perform crypto operations on data packet 600 to repopulate the table with that information. Base driver agent 630 can also use *SA info 632 to acquire the SA information necessary to process data packet 600. For example, if base driver agent 630 was reset, the information in SA table 631 would be lost, and the SA necessary to process data packet 600 could be acquired using *SA info 632. In another example, if NI 640 was dynamically installed and was unable to acquire the correct SA state, base driver agent 630 could use *SA info 632 to acquire the SA information necessary to perform crypto operations.

Data packet 600 is passed to NI 640 by base driver agent 630. In one embodiment, NI 640 has SA cache 641 that contains SA information. In one embodiment, NI 640 processes data packet 600 with crypto information received from base driver agent 630. NI 640 can then transmit data packet 600 over a network (not depicted in FIG. 6). For example, a data packet can be transmitted over the Internet on a secure traffic stream using IPsec. Some operating systems, for example, Windows® 2000 and Windows® XP, both available from Microsoft Corporation, guarantee that the SA tables are populated. This means that if SA table 631 loses it data, to maintain consistency with SA table 621 and the OS, the entire cache must be repopulated with data guaranteed by the OS to be in the tables, whether or not the data will be used in the future to perform crypto operations. One advantage to the intermediate driver agent 620 passing a pointer to base driver agent 630, is that if SA table 631 loses its data, the table can be repopulated as SAs are needed.

Figure 7:
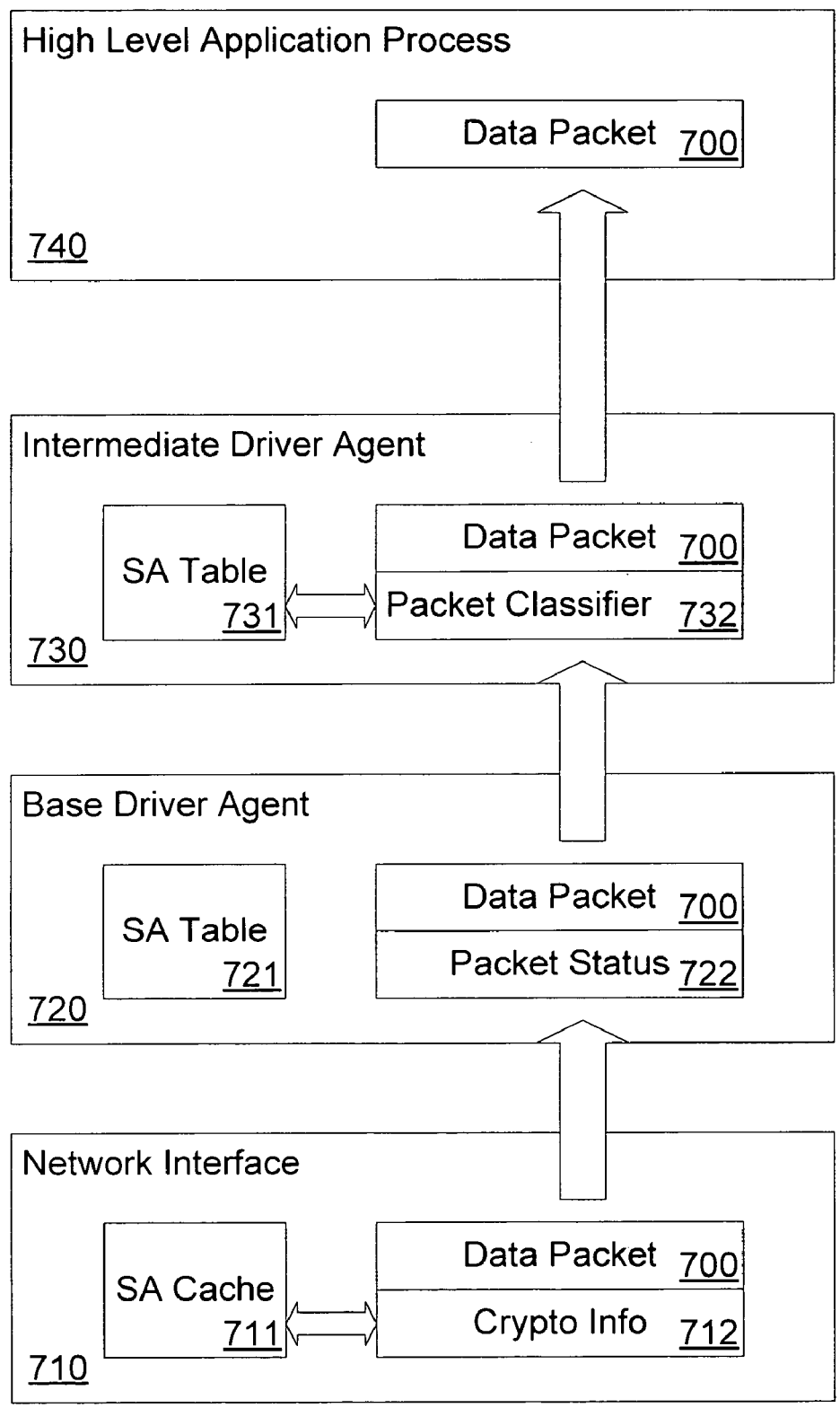
FIG. 7 is one embodiment of a flow diagram for reception of a data packet by an electronic system implementing a layered security driver.

FIG. 7 is one embodiment of a flow diagram for reception of a data packet by an electronic system implementing a layered security driver. Data packet 700 is received by NI 710 from a network (not depicted in FIG. 7). For example, data packet 700 can be part of a secure network stream from the Internet using IPsec. In one embodiment, NI 710 checks data packet 700 for its crypto information to determine how to perform crypto operations on data packet 700, such as authentication or decryption. If the crypto information associated with data packet 700 is in SA cache 711, NI 710 will extract crypto info 712. Although FIG. 7 depicts data structures of crypto information as containing SAs, SA cache 711, SA table 721, and SA table 731 are only example embodiments of data structures of crypto information, and are not limited to containing crypto information data structures that are SAs. In one embodiment, NI 710 uses crypto info 712 to perform hardware offload processing on data packet 700 prior to passing the received data packet 700 to base driver agent 720. In another embodiment, the SA necessary for performing crypto operations is not in cache 711, and NI 710 passes data packet 700 to base driver agent 720 without processing the packet.

Base driver agent 720 can be, for example, a NIC driver. In one embodiment, base driver agent 720 contains SA table 721, which is a table of SAs that contain all the information necessary to perform cryptography operations on data packet 700. Base driver agent 720 provides memory management for SA table 721, but SA table 721 does not necessarily reside in base driver agent 720. In one embodiment, base driver agent 720 checks SA table 720 for the SA associated with data packet 700. If it is not found, it can, for example, create a message indicating that the SA for that secure traffic stream is missing.

In one embodiment, base driver agent 720 creates SA status 721, which is status information about the processing of data packet 700. In one embodiment, SA status 722 indicates one of four predetermined messages regarding the processing of data packet 700. For example, SA status 722 may indicate that the packet was processed successfully without requiring hardware offloading. In another example, SA status 722 may indicate that the packet was processed successfully by hardware. In another example, SA status 722 may indicate that the packet was processed, but that the packet failed to pass authentication. In another example, SA status 722 may indicate that the packet could not be processed because there was a missing SA.

Base driver agent 720 passes data packet 700 up to intermediate driver agent 730. In one embodiment, intermediate driver agent 730 contains packet classifier 732. In one embodiment, intermediate driver agent 730 contains SA table 731. Packet classifier 732 checks data packet 700 for its SA information and matches it to a corresponding SA in SA table 731. In one embodiment, intermediate driver agent 730 uses the information in SA status 722 passed by base driver agent 720 to make decisions regarding the processing of data packet 700. For example, if the message of SA status 722 is that the data packet was processed successfully, or that it was processed but failed to pass authentication, no more processing will be performed on data packet 700, and it can be indicated by driver agent 730 to the upper layers.

In another example, if the message of SA status 722 is that the data packet could not be processed because the SA was missing, intermediate driver agent 730 directs the processing of data packet 700. For example, intermediate driver agent 730 may direct the processing of data packet 700 by software processing methods known in the art. In another example, intermediate driver agent 730 may direct the processing of data packet 700 by hardware processing methods known in the art. Intermediate driver agent 730 may also choose to add the SA for data packet 700 to SA table 721 and/or SA cache 711 so that future data packets using that SA can be processed with hardware.

In one embodiment, intermediate driver agent 730 indicates data packet 700 to system upper layers. For example, intermediate driver agent 730 may be an ANS driver that is the top layer of a BITS/BITW security driver implementation. Thus, intermediate driver agent 730 may pass data packet 700 to a system upper layer as conventional in known BITS/BITW implementations. In one embodiment, data packet 700 is passed to high level application process 740. High level application process 740 can be, for example, a TCP/IP stack.

What is claimed is:

1. A method in a data packet receiving path of a system, comprising:
    receiving a incoming encoded data packet at a lower layer of the system;
    determining whether the lower layer of the system has cryptography information cached with which to perform cryptography operations on the data packet, and if so, processing the data packet in hardware;
    if the lower layer of the system does not have cryptography information cached with which to perform the cryptography operations on the data packet, indicating the data packet to an upper layer of the system; and
    passing the cryptography information with which to perform the cryptography operations on the data packet from the upper layer to the lower layer to enable the lower layer to cache the cryptography information for use with subsequent cryptography operations associated with transmit or receipt of a subsequent data packet.

2. The method of claim 1, wherein the upper layer comprises an intermediate driver agent.

3. The method of claim 1, wherein the lower layer comprises base driver agent.

4. The method of claim 1, wherein the cryptography information comprises at least one of a unique identifier, a network protocol associated with the data packet, a security parameter index, a cryptographic key, a source identifier, or a destination identifier.

5. The method of claim 1, further comprising:
the upper layer of the system re-submitting the data packet to the lower layer to perform hardware offload of the cryptography operations to the lower layer.

6. The method of claim 1, wherein passing the cryptography information from the upper layer to the lower layer comprises:
passing a pointer from the upper layer to the lower layer that points to a data structure including the cryptography information.

7. The method of claim 6, further comprising:
the lower layer accessing the cryptography information in the data structure to populate a cryptography information table stored at the lower layer.

8. An article comprising a storage medium to provide machine-readable instructions that, when executed, cause one or more electronic systems to:
receive a incoming encoded data packet at a lower layer of the system;
determine whether the lower layer of the system has cryptography information cached with which to perform cryptography operations on the data packet, and if so, process the data packet in hardware;
if the lower layer of the system does not have cryptography information cached with which to perform the cryptography operations on the data packet, indicate the data packet to an upper layer of the system; and
pass the cryptography information with which to perform the cryptography operations on the data packet from the upper layer to the lower layer to enable the lower layer to cache the cryptography information for use with subsequent cryptography operations associated with transmit or receipt of a subsequent data packet.

9. The article of manufacture of claim 8, wherein the upper layer comprises an intermediate driver agent and the lower layer comprises base driver agent.

10. The article of manufacture of claim 8, wherein the cryptography information comprises at least one of a unique identifier, a network protocol associated with the data packet, a security parameter index, a cryptographic key, a source identifier, or a destination identifier.

11. The article of manufacture of claim 8, wherein the instructions to pass the cryptography information from the upper layer to the lower layer comprise instructions to:
pass a pointer from the upper layer to the lower layer that points to a data structure including the cryptography information.

12. An apparatus comprising:
a network interface card to receiving an encoded data packet from a network;
a base driver agent coupled to the network interface card to determine if the network interface card includes cryptography information cached on a memory on the network interface card with which to perform cryptography operations on the data packet, and if so, process the data packet in hardware, and if not, indicate the data packet to an upper layer driver; and
an upper layer driver coupled to the base driver agent to receive the indication of the data packet from the base driver agent, and pass the cryptography information with which to perform the cryptography operations on the data packet to the base driver agent to enable the base driver agent to cache the cryptography information on the network interface card for use with subsequent cryptography operations associated with transmit or receipt of a subsequent data packet.

13. The apparatus of claim 12, wherein the cryptography information comprises at least one of a unique identifier, a network protocol associated with the data packet, a security parameter index, a cryptographic key, a source identifier, or a destination identifier.

14. The apparatus of claim 12, the upper layer driver to further:
re-submit the data packet to the base driver agent to perform hardware offload of the cryptography operations to the network interface card.

15. The apparatus of claim 12, the upper layer driver to pass the cryptography information to the base driver agent further comprising:
the upper layer driver to pass a pointer to the base driver agent that points to a data structure including the cryptography information.

16. The apparatus of claim 15, the base driver agent to further:
access the cryptography information in the data structure to populate a cryptography information table stored on the network interface card.

17. A method in a data packet transmit path of a system, comprising:
associating cryptography information with a data packet at an upper layer of the system, the cryptography information to provide all information necessary to encode the data packet, the system including cryptography information caching;
passing the cryptography information with the data packet from the upper layer to a lower layer of the system, regardless of whether or not the lower layer already has the cryptography information cached;
performing cryptography operations on the data packet; and
if the lower layer does not already have the cryptography information cached, caching the cryptography information at the lower layer for use with subsequent cryptography operations associated with transmit or receipt of a subsequent data packet.

18. The method of claim 17, wherein the upper layer comprises an intermediate driver agent and the lower layer comprises base driver agent.

19. The method of claim 17, wherein the cryptography information comprises at least one of a unique identifier, a network protocol associated with the data packet, a security parameter index, a cryptographic key, a source identifier, or a destination identifier.

20. The method of claim 17, wherein passing the cryptography information from the upper layer to the lower layer comprises:
passing a pointer from the upper layer to the lower layer that points to a data structure including the cryptography information.

* * * * *